H. E. LUTZ.
APPARATUS FOR RECOVERING AND SECURING VOLATILE PRODUCTS FROM RELATIVELY FIXED HEAT RESISTANT SUBSTANCES.
APPLICATION FILED NOV. 14, 1918.

1,389,203.

Patented Aug. 30, 1921.
2 SHEETS—SHEET 1.

Inventor
HENRI E. LUTZ

Witness

By Henry S. Blackmore
Attorney

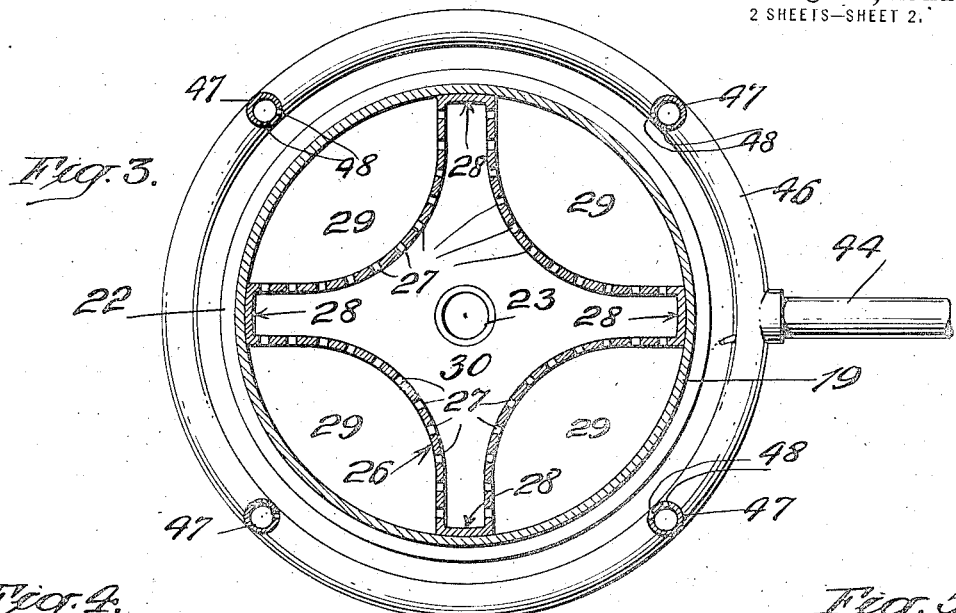
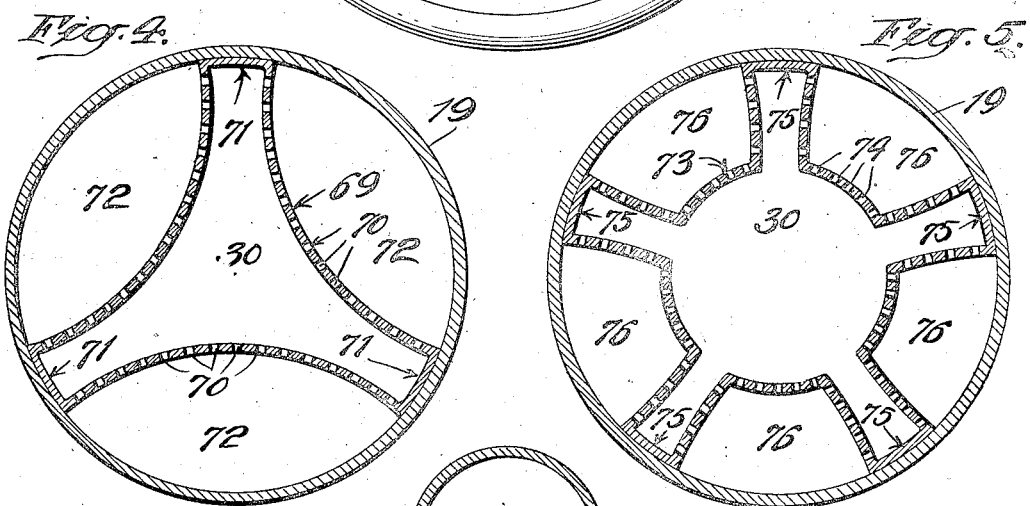
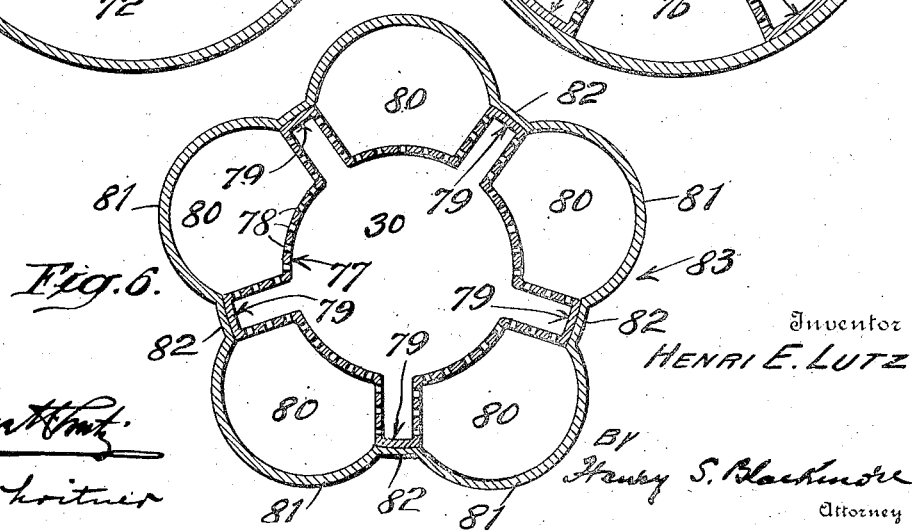

UNITED STATES PATENT OFFICE.

HENRI EDWIN LUTZ, OF PITTSBURGH, PENNSYLVANIA.

APPARATUS FOR RECOVERING AND SECURING VOLATILE PRODUCTS FROM RELATIVELY FIXED HEAT-RESISTANT SUBSTANCES.

1,389,203.  Specification of Letters Patent.  Patented Aug. 30, 1921.

Application filed November 14, 1918. Serial No. 262,615.

*To all whom it may concern:*

Be it known that I, HENRI EDWIN LUTZ, a citizen of the United States, residing at Pittsburgh, in the county of Allegheny, State of Pennsylvania, have invented certain new and useful Improvements in an Apparatus for Recovering and Securing Volatile Products from Relatively Fixed Heat-Resistant Substances, of which the following is a specification.

The invention relates to apparatus for heating and destructively distilling carbonaceous materials, such as coal or shale, and for securing the resulting residual carbon and the fusible and the volatile by-products.

One object of the invention is to produce an apparatus for accomplishing the elimination, in whole or in part, of the volatile and the fusible constituents of these materials while maintaining such thermal conditions as will preserve their original atomic combinations, without dissociation, re-combination or other chemical alteration, until those constituents are condensed or otherwise rendered available for use; and, a further object of the invention is to produce an apparatus in which the heating of such materials may be so controlled that the residual carbon, or coke, will be of uniform character throughout its mass and retain any desired quantity of its original fusible and volatile constituents.

Bituminous coal, and other similar carbonaceous substances, contain both fusible and volatile, and non-fusible and non-volatile constituents, and when it is destructively distilled, the fusible and the volatile constituents are driven off, leaving as a residue porous carbon which is known as coke, a material containing more or less of the fusible and volatile constituents, according to the character of the process to which the carbonaceous material has been subjected. If the mass should not be uniformly heated, the relatively high temperatures in certain parts thereof will cause decomposition or dissociation of some of the vaporous or gaseous emanations some of which will re-combine to produce new and undesirable substances of a more or less complex nature and of doubtful utility from a commercial point of view.

The apparatus in which my invention is embodied, admits of not only the maintenance of uniform thermal conditions throughout the coking zone, but the control of the conditions upon which the production of various grades of coke is dependent, and this will appear from the following description and from the accompanying drawings, in which—

Fig. 3 is a horizontal sectional view of the apparatus taken on the line 3—3 of Fig. 1, the heating chamber being omitted;

Figs. 4, 5 and 6 are horizontal sectional views showing modified forms of retort.

Figures 1, 2:
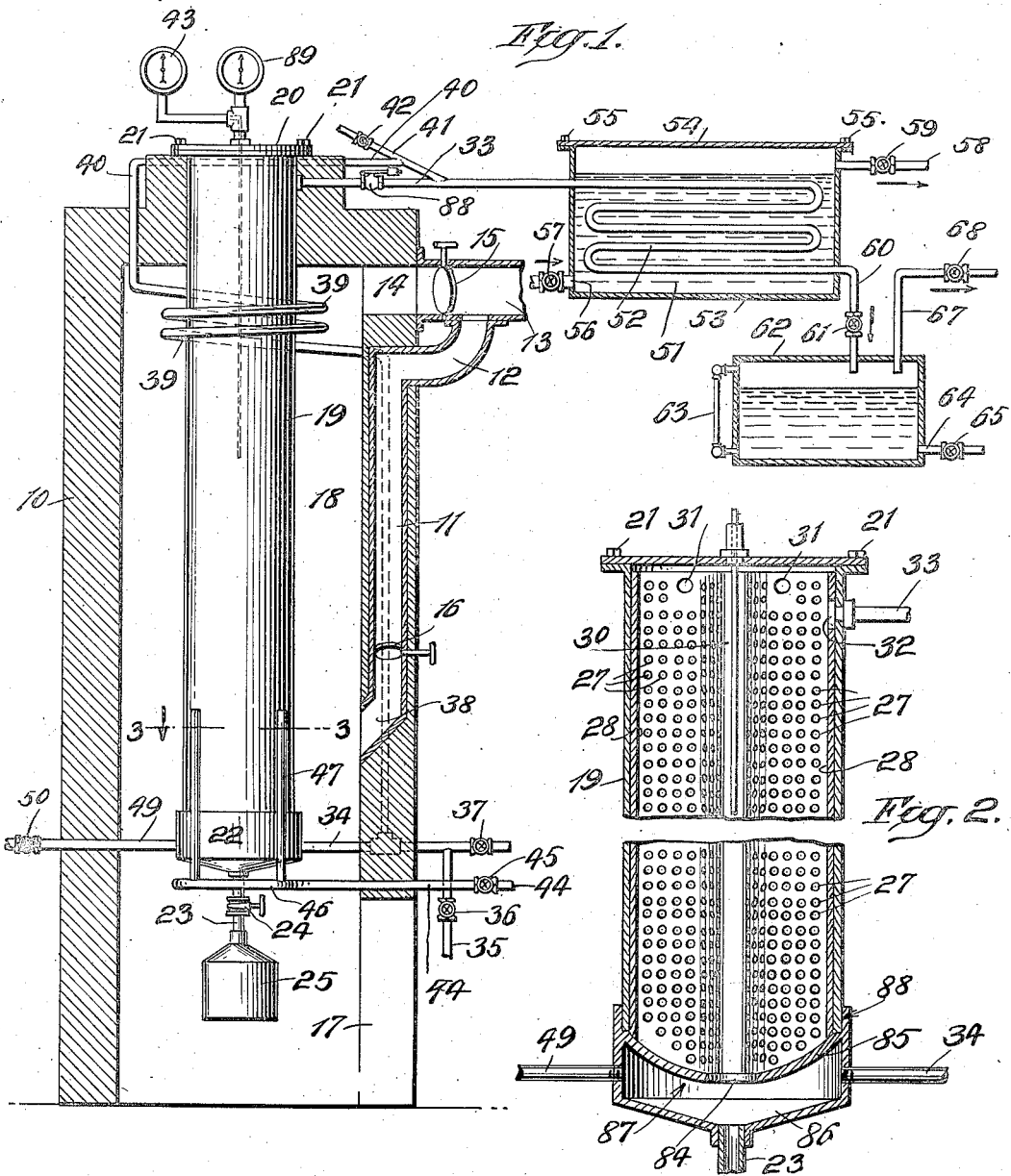
Figure 1 is a side view of an apparatus, partly in section, embodying my invention.
Fig. 2 is a vertical section of a retort constituting a part of the apparatus.

The furnace employed for heating the retort of my apparatus, may be of any suitable character, but superior results may be attained by using a furnace of the construction shown in Fig. 1 wherein 10 indicates the furnace wall, 11 an indirect flue leading from the lower part of the combustion chamber 18, and having a damper 16 for controlling the indirect draft of the furnace. This flue 11 terminates in an elbow 12 which communicates with the direct exhaust flue 14 of the furnace, and said exhaust flue 14 contains a damper 15 which may be closed after the furnace has become well heated in order that the products of combustion will be compelled to descend around the retort and be emitted through the flue 11, the elbow 12 and the exhaust flue 14, the damper 16 being at that time open. The object of using the direct draft during the initial stages of the operation is to avoid the accumulation of explosive mixtures in the upper part of the combustion chamber, as would be the case if the damper 15 were closed at the beginning of the operation; and the object of employing an indirect draft is to not only detain the products of combustion until they have given off as much heat as possible to the retort, but to insure the uniform heating of the retort throughout its entire extent. The furnace is provided with an opening 17 through which access may be had to the adjacent portions of the retort.

The retort 19 is provided with burners 47, 48 of usual character, and these burners are supplied with fuel through the pipes 44 and 46, the flow of fuel being controlled by a valve 45, and said retort is supported in the furnace by a flange at its upper end to which is secured the cover 20 by the bolts 21.

The volatile emanations of the carbonaceous fuel are led from the upper end of the retort by a conduit 33 and thence pass into the condensing coil 52 disposed within the reservoir 53 in which is a body of water 51 supplied through the inlet 56, controlled by the valve 57, and exhausted through the outlet 58, controlled by the valve 59. The reservoir 53 is provided with a cover 54 secured thereto by bolts 55. An outlet 60 controlled by a valve 61 carries the condensates into a storage reservoir 62 from which the fixed gases are discharged through the outlet 67 controlled by the valve 68. The storage reservoir may be evacuated through the outlet 64 controlled by the valve 65, and it is provided with a gage 63 for determining the height of the liquid therein.

The bottom of the retort is indicated by the numeral 85, and this bottom is depressed at the center to facilitate the flow of the heavier products of the distillation through the central discharge opening 84, and it is secured to the wall of the retort at 88. A receptacle 87, constituting a part of the bottom of the retort, forms a chamber 86 into which said heavier products are discharged, and this receptacle is provided with pipes 34 and 49, respectively controlled by valves 37 and 50. Leading from the pipe 34 is a conduit 38 which includes a superheater 39 encircling the retort 19, the terminal portion of which superheater enters the conduit 33 at an acute angle to produce an injector action for drawing gases and vapors from said retort. This injector action may be supplemented, if necessary, by the introduction of nitrogen, or other inert medium, through the conduit 41 containing a controlling valve 42. The object of the conduit 49, is to supply under pressure an inert medium, such as nitrogen, at the lower end of the retort, to thereby hasten the expulsion of the lighter products of distillation through the conduit 33 in order that the period of their detention within the active zone of the apparatus may be as short as possible and the attainment of temperatures at which they respectively dissociate, or produce undesirable by-products, or are changed into permanent gases which cannot be condensed to liquid form or effectively handled for commercial purposes, or re-converted into desired commercial products, will be impossible.

The pipe 34 is to be supplied with gases and vapors from the retort 19, and these educts, being highly heated in the conduit 38 and its superheater 39, are by their levity caused to flow upward and into the conduit 38 with increased velocity, to thus enhance the inductive action of the terminal portion 40 of said conduit 38. This inductive action may be intensified by admitting a compressed inert medium, such as carbon monoxid or nitrogen, through the conduit 35, or by admitting another compressed and inert medium through the valve 37, should more than one such medium be available.

The chamber 86 is provided with an outlet 23, controlled by a valve 24, and pendently secured to said outlet is a reservoir 25. This reservoir is disposed opposite the opening 17, and is removably connected to the outlet 23.

The retort contains removable pocket walls 26 (Figs. 2 and 3), and these walls are provided with perforations 27 which freely permit the fluent emanations from the carbonaceous substances within the pockets 29 to pass into the inner chamber 30 around which said pockets are symmetrically disposed. These pockets are of such shape as to hold the carbonaceous material in relatively thin masses of considerable surface areas as regards the heat-receiving and the educt-emitting portions thereof, the object being not only to enable the heat to penetrate with rapidity all parts of the masses of the carbonaceous substances, to thereby effectuate the destructive distillation uniformly and without over-heating of either the educts or the residual substances, but to enable the educts to escape from the coking zone immediately upon their formation and before they become heated to the temperatures of dissociation or re-combination, and before any uncondensable and undesirable gases are produced. The several pockets 29 are spaced from each other by the imperforate portions 28 of the pocket walls 26 so that their perforated areas comprehend substantially or more than half of the total superficies of the charge, instead of less than half as much, as in coking apparatus wherein there is a single coking pocket surrounding a perforated cylinder. The construction, furthermore, affords an open path for the escape of the products of the distillation, as well as a full opportunity for their admixture and the equalization of their temperatures, provided the products of the several pockets are of unequal temperatures. Also, the several pockets are substantially inter-communicating, and for this reason are subject to the same degree of convective heating, as the gases and vapors which carry the heat intermingle and circulate through the inner chamber 30 and around and through the said pockets.

The substantial results attained by the use of the invention, are the quick and uniform heating of the several masses of carbonaceous substances contained in the pockets of the retort and the elimination of both the heavier and the lighter distillates at minimum temperatures, that is to say, at temperatures at which the respective emanations will remain unaltered in a chemical sense, and in their final condensed forms contain the same substances as the volatilizable constituents of the undistilled carbonaceous material, instead of other substances such as would be produced as by-products if the temperatures were permitted to rise above the dissociating points of some or all of the substances included in those emanations; equalization of the temperatures of the freely escaping gases and vapors due to their ability to intermingle and diffuse into each other, and incidentally the equalization of the temperatures of the solids and the gases and vapors following the admission of these fluent substances into the pockets; the rapid discharge of the distillates from the retort immediately upon their formation and the consequent avoidance of pressures which would retard the elimination and cause over-heating of such portions thereof as have not escaped from the interstices of the charge; the production of coke of uniform and homogeneous quality and containing any desired quantity of volatilizable substances whereby the body of the flame occasioned by its combustion may be of a desired length; a maximum yield of condensable distillates, and a saving of heat energy which in other apparatus is expended in promoting the undesirable dissociation of the volatilized constituents of the charge.

The temperature of the charge and of the distillates in my apparatus, may be as low as 750 degrees F., the effectiveness of this low temperature being due to the fact that no parts of the charge have to be overheated in order to raise other parts thereof to the temperature at which distillation takes place.

The form of the apparatus and of the pockets may be varied. In Fig. 3 four pockets are shown, while in Fig. 4 there are shown three pockets 72 bounded in part by walls 69 having perforations 70 and united by the walls 71.

Fig. 5 shows five pockets 76 having perforations 73 and having connecting walls 75.

Fig. 6 shows a retort 81 divided into five pockets 80 by the walls 77 having perforations 78, and these are connected by the walls 79. This retort, instead of being cylindrical, is bulged at a plurality of points to increase the heating surface of each of the pockets.

The dividing walls of the retort are provided with openings 31 into which hooks may be inserted when it is desired to remove the pocket walls and the contents of the pockets from the retort, and introduce a new charge; and the charge may be any decomposable substance such as bituminous coal, lignite or cellulose, and the by-products may be benzol, toluol, xylol, etc., if the charge consists of bituminous coal, and may be methyl alcohol, acetone, acetic or pyrolygneous acid, creosote, etc., if the charge consists of lignite, cellulose, etc., the general principle underlying the operation being the same regardless of the nature of the charge.

A pyrometer 89 may be employed for the purpose of ascertaining the uniform temperature of the apparatus, but the use of such instrument is not absolutely essential because the conditions within the apparatus can be ascertained by noting the character of the substances entering the condenser and the reservoir for the heavier distillates. If the temperature is too high, there will be an excess of fixed gases, whereas if the temperature is low enough to insure the maximum production of condensable products, this satisfactory thermal condition will be manifested by the condensation of the greater portion of the substances flowing into the condenser. Should the temperature be extremely high, the natural and desired quality of the liquid substances in the reservoir would be seriously affected. 43 is a pressure gage.

The inductive suction at the final outlet of the retort, not only hastens the flow of the distillates from the relatively hot zone of the pockets and through the interior and cooler zones of the retort wherein the temperature conditions are always sufficiently low to maintain said distillates as condensable vapors, but produces a refrigerative expansion of those vapors, whereby any danger of over-heating, occasioned by transmission of heat from the combustion chamber, is avoided. Furthermore, inasmuch as the aggregate efflux capacity of the perforations of the several retaining pockets of the retort, is substantially as great as that of the interstices of the charges of carbonaceous material, of whatever kind, even the uninduced or natural flow of the distillates is sufficiently rapid to cause them to leave the hot distilling zone while they are still in condensable vaporous conditions, and before their temperatures reach the dissociating points of any of their constituents, thus enabling the apparatus to produce a quantitative yield of condensable vapors from a given charge of carbonaceous material.

The favorable thermal conditions under which a maximum yield of useful vaporous distillates is produced, are aided by the carrying of the current downward through the retort in prolonged contact with the carbonaceous material which, because of the large aggregate area of the perforations of the pockets, is exposed to the heat of said vapors, so that the temperatures of the different portions of the charge become substantially equalized, to thereby compensate for the lack of heat in the lower part of the apparatus and to avoid the over-heating of the upper portion of the charge.

I am aware that the retorts of distilling apparatus have been provided with a perforated central tube through which distillates are drawn by a suction device, but such a tube is necessarily small and consequently incapable of having a large aggregate area of efflux openings through which the full volume of the distillates may readily pass as they flow from the distilling zone to the condenser of the apparatus. In these apparatus the distillates are liable to be and usually are held back for a considerable period during which permanent gases are formed and the quantity of condensable vapors correspondingly diminished.

Having thus described my invention, what I claim is:

1. An apparatus for distilling carbonaceous material, comprising means for retaining a mass of such material in a relatively thin body, means for heating all parts of said mass to substantially a minimum distilling temperature, and distillate-emitting passages having an efflux area substantially at least as large as the heating surface of the retaining means.

2. An apparatus for distilling carbonaceous material, having a distilling chamber, a source of heat proximate said chamber, and an efflux passage leading from said chamber and having a discharge capacity sufficient to liberate products of distillation without substantial convergence.

3. An apparatus for distilling carbonaceous material, including a retort provided with a plurality of separated pockets, each having perforations in substantially all parts of its inner wall, and means for heating the outer walls of said pockets.

4. An apparatus for distilling carbonaceous material, having a distilling chamber provided with a heat-receiving wall and a perforated wall for the escape of distillates, and provided also with an efflux passage for receiving distillates from all of the perforations of said wall, the area of said perforated wall being substantially at least as large as that of the heat receiving surface.

5. A distilling retort comprising an outer surface to be heated and an interiorly-disposed distillate efflux having a perforated wall approximately equal to or greater in area than the outer surface for allowing the distillates to escape as soon as formed and without material detention thereof.

6. An apparatus for distilling carbonaceous material, having a combustion chamber, a retort disposed within said combustion chamber, and vertically removable pockets arranged within said retort, said pockets being provided with perforations in their inner walls and proximate sides.

7. An apparatus for distilling carbonaceous material, having a plurality of spaced pockets, each having an outwardly-curved outer wall and an inwardly-projecting and perforated inner wall.

8. An apparatus for distilling carbonaceous material, having a plurality of spaced pockets, each having an outwardly-bulged outer wall and an inwardly-projecting and perforated inner wall.

9. An apparatus for distilling carbonaceous material, having a retort provided with an interiorly-disposed educt passage, and a plurality of other educt passages spaced around, and communicating with said educt passage, and dividing the retort into pockets for holding carbonaceous material.

In witness whereof I affix my signature in the presence of two witnesses.

HENRI EDWIN LUTZ. [L. S.]

Witnesses:
F. L. WHRITNER,
R. H. DOVE.